United States Patent [19]

Howard et al.

[11] Patent Number: 5,244,256
[45] Date of Patent: Sep. 14, 1993

[54] HAULAGE CHAIN FOR A MINERAL WINNING INSTALLATION

[75] Inventors: Peter Howard, Newark; Terence W. Scrutton, Worcester, both of England

[73] Assignee: Meco A.F.C. Limited, Worcester, England

[21] Appl. No.: 905,819

[22] Filed: Jun. 29, 1992

[30] Foreign Application Priority Data

Jul. 18, 1991 [GB] United Kingdom ................ 9115530

[51] Int. Cl.$^5$ .............................................. F21C 29/10
[52] U.S. Cl. ........................................... 299/43; 59/84
[58] Field of Search ............... 299/43; 59/84; 474/157

[56] References Cited

U.S. PATENT DOCUMENTS

| | | | |
|---|---|---|---|
| 4,372,619 | 2/1983 | Braun | 299/43 |
| 4,819,989 | 4/1989 | Kleine | 299/43 |
| 5,131,723 | 7/1992 | Roling | 299/43 |

FOREIGN PATENT DOCUMENTS

| | | |
|---|---|---|
| 0059051 | 6/1985 | European Pat. Off. . |
| 0206610 | 12/1986 | European Pat. Off. . |
| 540780 | 10/1941 | United Kingdom . |
| 693734 | 7/1953 | United Kingdom . |
| 852526 | 10/1960 | United Kingdom . |

*Primary Examiner*—David J. Bagnell
*Attorney, Agent, or Firm*—Young & Thompson

[57] ABSTRACT

A haulage chain for a mineral winning installation, comprises a plurality of first links and a plurality of second links alternating with one another along the longitudinal extent of the chain. Each first link defines a single closed loop and each second link defines three closed loops, two of which are provided by opposite end portions of the second link and lie in a common plane and the other of which is provided by an intermediate portion between the two end portions and lies in a plane normal or substantially normal to the common plane of the two end loops. The first links each pass through opposite end portions of a pair of adjacent second links and maintain a substantially even pitch between the said end portions of all the second links.

12 Claims, 2 Drawing Sheets

HAULAGE CHAIN FOR A MINERAL WINNING INSTALLATION

INTRODUCTION

This invention relates to a haulage chain for a mineral winning installation and to a mineral winning installation having such a haulage chain.

Mineral winning installations comprise a conveyor, e.g. a scraper chain conveyor, a mineral winning machine, e.g. a shearer, and a haulage system for moving the mineral winning machine along the conveyor. The haulage system often comprises a round link chain which is supported with respect to the conveyor, and a sprocket wheel which is driven in rotation by the mineral winning machine and which cooperates with the links of the chain to move the mineral winning machine along the conveyor. This haulage system suffers from a number of drawbacks.

SUMMARY OF THE INVENTION

According to a first aspect of the invention, there is provided a haulage chain for a mineral winning installation, comprising a plurality of first links and a plurality of second links alternating with one another along the longitudinal extent of the chain, wherein each second link defines at least two loops which are provided by opposite end portions of the second link and which lie in a common plane, and wherein the first links each pass through opposite end portions of a pair of adjacent second links and maintain a substantially even pitch between the said end portions of all the second links.

Preferably, each first link defines a single loop.

Preferably, the outer periphery of each end portion of each second link is generally hexagonal as viewed in a direction normal to the plane of the loop defined by the end portion. This has the advantage that the chain can be used in an inverted condition if the upper side of the chain becomes worn.

Preferably, the opening in each end portion of each second link is circular or substantially circular as viewed in a direction normal to the plane of the loop defined by the end portion, and the cross-section of each first link is circular or substantially circular.

Preferably, each second link defines three loops, two of which are provided by the opposite end portions of the second link and lie in a common plane and the other of which is provided by an intermediate portion between the two end portions and lies in a plane normal or substantially normal to the common plane of the two end loops.

Preferably, the opening in each first link is such that there is a clear space within the first link and between opposite end portions of a pair of associated second links corresponding to the length of the opening in the intermediate portion of each second link.

Preferably, the two end portions of each second link are narrower than the intermediate portion of each second link when viewed in a direction normal to the plane of the loop defined by the intermediate portion. In this case, the width of each end portion is typically no greater than the width of the opening in the intermediate portion.

Preferably, the opening in the intermediate portion of each second link is substantially rectangular when viewed in a direction normal to the plane of the loop defined by the intermediate portion and in this case, preferably, each first link together with opposite end portions of a pair of associated second links define an opening which substantially corresponds to the opening in the intermediate portion of each second link when viewed in a direction normal to the plane of the loop defined by the first ink.

Preferably, the loops defined by the first and second links are closed loops.

Preferably, the first links are wire links and the second links are forged or cast links.

According to a second aspect of the invention there is provided a haulage chain for a mineral winning installation, comprising a plurality of first links and a plurality of second links alternating with one another along the longitudinal extent of the chain, wherein each second link defines at least two teeth for engagement by a toothed wheel, two of the at least two teeth being provided by opposite end portions of the second link, which opposite end portions define loops which lie in a common plane, and wherein the first links each pass through two loops provided by opposite end portions of a pair of adjacent second links and maintain a substantially even pitch between the teeth of all said second links.

According to a third aspect of the invention, there is provided a mineral winning installation comprising a conveyor, a mineral winning machine and a haulage system for moving the mineral winning machine along the conveyor, the haulage system comprising a haulage chain as set forth in the first aspect of the invention, means for supporting the haulage chain with respect to the conveyor, and a toothed wheel which is rotatable by the mineral winning machine and which cooperates with the chain to move the mineral winning machine along the conveyor.

Preferably, the toothed wheel is a gear wheel which, advantageously, has substantially involute teeth.

The invention will now be more particularly described, by way of example, with reference to the accompanying drawings.

DESCRIPTION OF THE PREFERRED EMBODIMENTS

Figure 1:
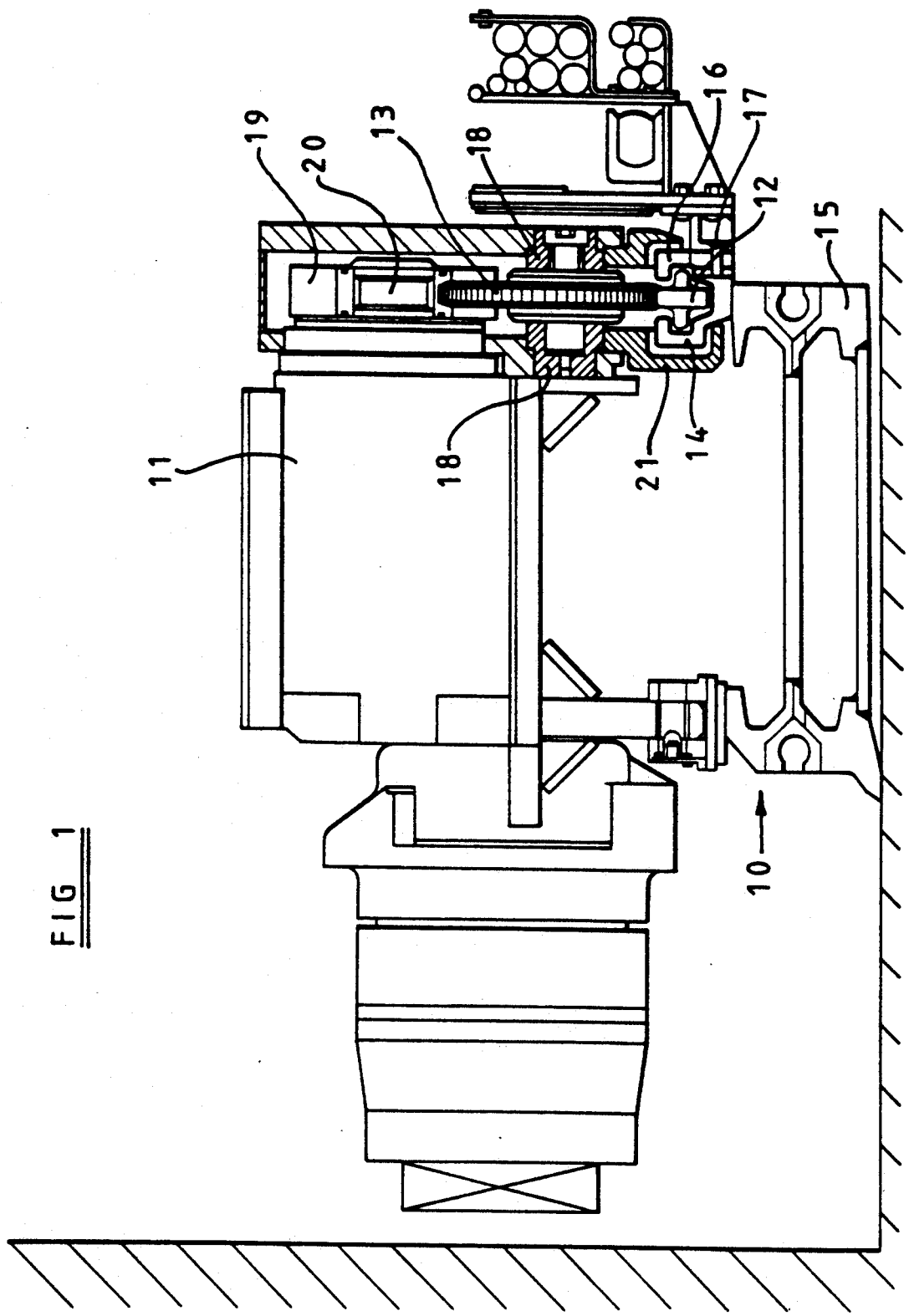
FIG. 1 is a sectional view through a mineral winning installation incorporating one embodiment of a haulage chain according to the first aspect of the invention.

Referring firstly to FIG. 1, the mineral winning installation shown therein comprises a scraper chain conveyor 10 and a mineral winning machine in the form of a shearer 11 bridging the conveyor 10. The shearer 11 is supported by the conveyor for movement therealong by a haulage system comprising a haulage chain 12 and a toothed wheel, preferably a gear wheel 13 having substantially involute teeth, which is rotated by the shearer 11 and which co-operates with the chain 12.

The pan of the conveyor 12 is formed in sections joined end to end so as to enable the conveyor to follow the contour of the mine floor and to follow curves in the mine face.

The chain 12 is held taut and is supported along its length by elongate brackets 14 each secured, such as by bolts or welding, to a side trim 15 bolted to, or formed as an integral casting with, the goaf side of an associated section of the conveyor 10, and by inverted L-shaped captivating plates 16 secured to the brackets 14 by tension pins 17. Alternatively, the chain 12 could be provided on the face side of the conveyor 10 or two chains could be provided, one on either side of the conveyor 10.

The gear wheel 13 is journalled for rotation in bearings 18 and is in direct engagement with a further gear wheel 19 rotatable with a main drive shaft 20 of the shearer 11.

A guide shoe 21 is articulated with respect to the shearer 11 and co-operates with the brackets 14 and captivating plates 16 to guide the shearer 11 along the conveyor 10.

The chain 12 comprises a plurality of first links 31 and a plurality of second links 32 which alternate with one another along the longitudinal extent of the chain.

The links 31 are oval in overall configuration and are formed from circular section wire, typically about 34 mm in diameter. They are supported by the brackets 14 and captivating plates 16 so as to lie horizontally or substantially horizontally. Typically, each link 31 has an overall length of about 225 mm and an overall width of about 120 mm. The links 31 also support an adjacent link 32 as the shearer 11 pushes off the link 32.

Figure 2:
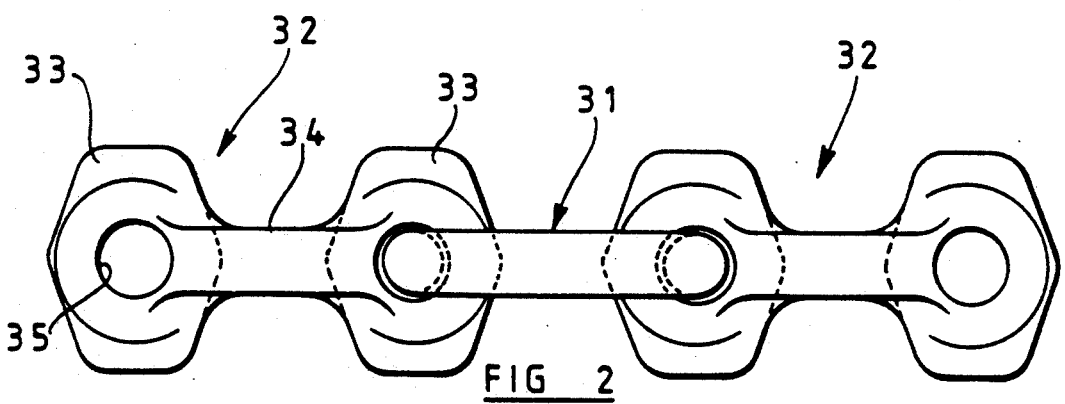
FIG. 2 is a side view of part of the chain of FIG. 1.

The links 32 are forged or cast links and each comprises two vertical link portions 33, each defining a closed loop about an opening 35, at opposite ends of the link 32 and a horizontal link portion 34, defining a closed loop about an opening 36, between the link portions 33. The outer periphery of each link portion 33 is generally hexagonal as viewed from the side (FIG. 2) and the upper leading and trailing faces 33a and 33b of each link portion 33 are typically inclined with respect to the vertical by about 20 degrees. This ensures that the link portions 33 co-operate with the teeth of the gear wheel 13 to give greater efficiency and more power to cutting elements of the shearer 11 than is possible with a round link chain and sprocket. The links 32 are also supported by the brackets 14 and the captivating plates 16 so as to lie horizontally or substantially horizontally.

The support offered by the brackets 14 and the captivating plates 16 to the links 31 and the links 32 ensures that the system can operate in compression as well as tension.

Typically, each link 32 has an overall length of about 295 mm and an overall width of about 120 mm. The links 32 are therefore longer than the links 31 but of substantially the same width as the links 31.

Figure 5:
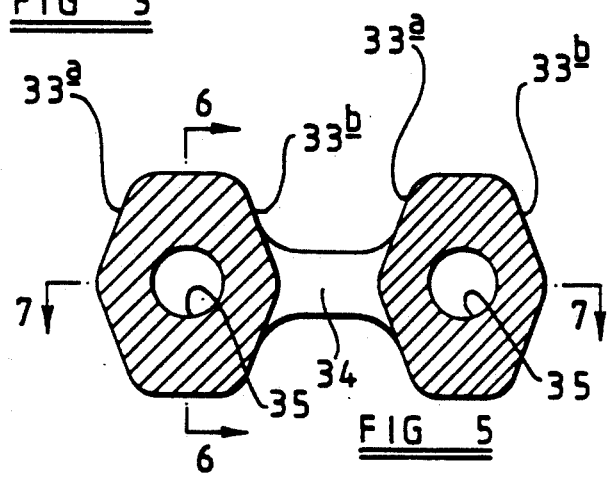
FIG. 5 is a section taken along line 5—5 of FIG. 4.
Figure 6:
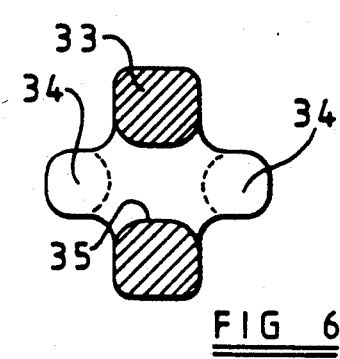
FIG. 6 is a section taken along line 6—6 of FIG. 5.

The opening 35 in each vertical link portion 33 is circular or substantially circular as viewed from the side (FIG. 2) and in vertical section (FIG. 5) and has a minimum diameter, typically about 40 mm, midway between its ends.

Each link 31 extends through the opening 35 in each of two opposite vertical link portions 33 of a pair of adjacent links 32, with a clearance sufficient to enable the chain to flex both horizontally and vertically, and each link portion 33 is of generally D-shaped cross-section (with its more rounded face bounding its opening 35), particularly in a region where the link portion 33 co-operates with an associated link 31, in order to allow the chain to flex as aforesaid.

Figure 3:
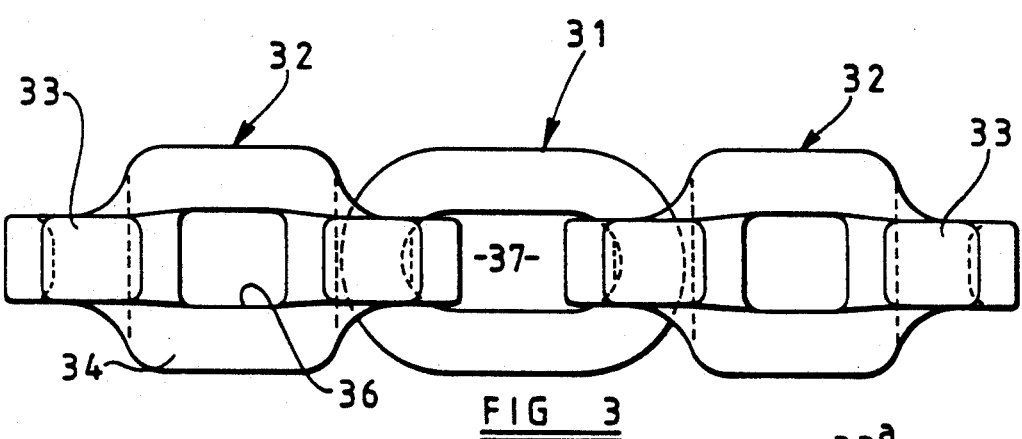
FIG. 3 is a plan view of part of the chain of FIG. 1.
Figure 4:
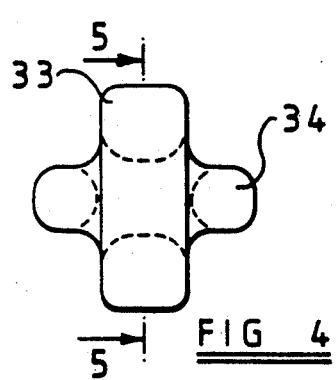
FIG. 4 is an end view of one of the forged links of the chain.
Figure 7:
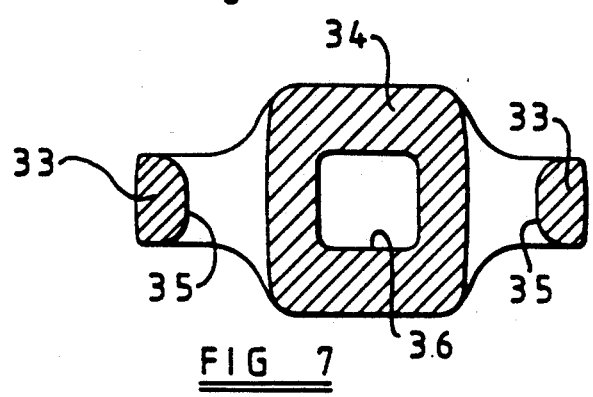
FIG. 7 is a section taken along line 7—7 of FIG. 5.

The two vertical link portions 33 are much narrower than the horizontal link portion 34 when viewed in plan (FIG. 3) or in horizontal section (FIG. 7) and typically have a width no greater than the width of the opening 36 in the link portion 34.

The opening 36 in the horizontal link portion 34 is substantially square when viewed in plan (FIG. 3) and each link 31, together with the vertical link portions 33 at opposite ends of a pair of adjacent links 32, defines an opening 37, which corresponds in dimensions and shape to the opening 36 in the link portion 34 when viewed in plan. This allows the openings 36 and 37 to receive ends of the teeth of the gear wheel 13 as the gear wheel moves along the chain 12.

The chain 12 is equivalent to a rack having teeth defined by the vertical link portions 33 of the links 32 and flexibility in both the horizontal and vertical planes. This flexibility is important in order to allow the chain to follow the pan sections of the conveyor 10. The links 31 co-operate with the links 32 to maintain a substantially even pitch between the vertical link portions 33 resulting in a smooth, efficient and reliable haulage system. On start up, the chain 12 will extend to give a cushioned start to the shearer 11 and this is often considered an advantage from a mining viewpoint.

The embodiment described above does not suffer from the high transient forces which occur in prior art arrangements utilising round link chains and sprocket wheels as a result of cyclic variation and uneven pitching. Also, it is not possible for the links of the chain to bunch.

The embodiment described above is given by way of example only and various modifications may be apparent to persons skilled in the art without departing from the scope of the invention. For example, the gear wheel 13 could be replaced by a sprocket wheel although in that event the shape of the openings 36 and 37 may then be different from those shown in the drawings. Also, an indirect drive could be provided between the gear wheels 13 and 19 and indeed this would be necessary if the gear wheel 13 was to be replaced by a sprocket wheel. Also, by appropriate design of the end portions 33 of the links 32, the openings 36 could be omitted with the result that the links 32 each define only two loops. Also, it is conceivable that in some cases some or all the loops defined by the links 31 and 32 would not be completely closed loops.

In a further embodiment, the links 32 could be longer than those previously described and could have one or more vertical portions intermediate the two vertical end portions 33. Specifically, the three links 32, 31 and 32 shown in FIGS. 2 and 3 could be forged as a single second link. Such a link would have four equidistantly spaced vertical link portions of which only the end two would define loops having openings 35. Such a link would also have three horizontal link portions which, subject to the modification referred to in the preceding paragraph, would each define a closed loop about an opening 36.

What is claimed is:

1. A haulage chain for a mineral winning installation, comprising a plurality of first links and a plurality of second links alternating with one another along the longitudinal extent of the chain, wherein each second link defines at least two loops which are provided by opposite end portions of the second link and which lie in a common plane, said end portions defining teeth for engagement by a toothed wheel, and wherein the first links each pass through the loops provided by opposite end portions of a pair of adjacent second links and maintain a substantially even pitch between the said end portions of all the second links.

2. A haulage chain as claimed in claim 1, wherein each first link defines a single loop.

3. A haulage chain as claimed in claim 1, wherein each second link defines three loops, two of which are provided by the opposite end portions of the second link and lie in a common plane and the other of which is provided by an intermediate portion between the two end portions and lies in a plane normal or substantially normal to the common plane of the two end loops.

4. A haulage chain as claimed in claim 3, wherein each first link defines a single loop and wherein the opening in each first link is such that there is a clear space within the first link and between opposite end portions of a pair of associated second links corresponding substantially to the length of the opening in the intermediate portion of each second link.

5. A haulage chain as claimed in claim 3, wherein the two end portions of each second link are narrower than the intermediate portion of each second link when viewed in a direction normal to the plane of the loop defined by the intermediate portion.

6. A haulage chain as claimed in claim 3, wherein the opening in the intermediate portion of each second link is substantially rectangular when viewed in a direction normal to the plane of the loop defined by the intermediate portion.

7. A haulage chain as claimed in claim 6, wherein each first link together with opposite end portions of a pair of associated second links define an opening which substantially corresponds to the opening in the intermediate portion of each second link when viewed in a direction normal to the plane of the loop defined by the first link.

8. A haulage chain as claimed in claim 1, wherein the outer periphery of each end portion of each second link is generally hexagonal as viewed in a direction normal to the plane of the loop defined by the end portion.

9. A haulage chain as claimed in claim 1, wherein the opening in each end portion of each second link is circular or substantially circular as viewed in a direction normal to the plane of the loop defined by the end portion, and the cross-section of each first link is circular or substantially circular.

10. A haulage chain for a mineral winning installation, comprising a plurality of first links and a plurality of second links alternating with one another along the longitudinal extent of the chain, wherein each second link defines at least two teeth for engagement by a toothed wheel, two of the at least two teeth being provided by opposite end portions of the second link, which opposite end portions define loops which lie in a common plane, and wherein the first links each pass through two loops provided by opposite end portions of a pair of adjacent second links and maintain a substantially even pitch between the teeth of all said second links.

11. A haulage chain as claimed in claim 10, wherein each second link has a further loop between the or each pair of teeth, the or each further loop lying in a plane normal or substantially normal to the common plane of the first mentioned loops.

12. A mineral winning installation comprising a conveyor, a mineral winning machine and a haulage system for moving the mineral winning machine along the conveyor, the haulage system comprising:

a haulage chain comprising a plurality of first links and a plurality of second links alternating with one another along the longitudinal extent of the chain, wherein each second link defines at least two teeth for engagement by a toothed wheel, two of the at least two teeth being provided by opposite end portions of the second link, which opposite end portions define loops which lie in a common plane, and wherein the first links each pass through two loops provided by opposite end portions of a pair of adjacent second links and maintain a substantially even pitch between the teeth of all said second links, means for supporting the haulage chain with respect to the conveyor, and a toothed wheel which is rotatable by the mineral winning machine and which cooperates with the chain to move the mineral winning machine along the conveyor.

* * * * *